_United States Patent_ [19]

Teiling

[11] 4,047,087
[45] Sept. 6, 1977

[54] ELECTROMECHANICAL TRANSDUCER

[75] Inventor: Carl Torbern Teiling, Lidingo, Sweden

[73] Assignee: AGA Aktiebolag, Lidingo, Sweden

[21] Appl. No.: 621,571

[22] Filed: Oct. 10, 1975

[30] Foreign Application Priority Data

Oct. 15, 1974 Sweden .................................. 7412929

[51] Int. Cl.$^2$ ............................................. G05B 1/06
[52] U.S. Cl. .............................. 318/661; 340/347 SY
[58] Field of Search ............... 318/656, 659, 660, 661; 340/347 SY

[56] References Cited

U.S. PATENT DOCUMENTS

| 3,419,774 | 12/1968 | Hartley | 318/661 |
| 3,555,542 | 1/1971 | Guiot | 318/661 X |
| 3,562,740 | 2/1971 | Watkins | 318/661 X |

_Primary Examiner_—B. Dobeck
_Attorney, Agent, or Firm_—Lerner, David, Littenberg & Samuel

[57] ABSTRACT

An electromechanical transducer for converting mechanical analog angular information to electrical linear information, utilizing a primary winding and a first and second secondary winding, said secondary windings being arranged perpendicular to each other and rotatable in relationship to the primary winding. The primary winding is connected to the output of an amplifier. The amplifier is inductively fed back by means of the primary winding and one of the secondary windings. The input voltage of the amplifier is related to the voltage across the other secondary winding and privides a linear measure for the rotation of the secondary windings in relationship to the primary winding.

5 Claims, 2 Drawing Figures

ELECTROMECHANICAL TRANSDUCER

BACKGROUND OF THE INVENTION

The present invention refers to an electromechanical transducer for converting mechanical analog angular information to electrical linear information.

In servo and measuring technique, there is often a need for electrocmechanical transducers for converting mechanical analog data to electrical data. These data apply especially to angular information, for which the most common member is the potentiometer. The most common potentiometer generates an ouput voltage which is linear with respect to the mechanical rotation. A disadvantage of the potentiometer is that a movable galvanic contact slides along a resistance coil operating as a voltage divider. It is difficult to obtain high reliability and resolution and the accuracy will, therefore, be decreased.

Another electromechanical member is the rotatable inducer. There are many types of inducers, one of which, comprising a normal primary winding and a secondary winding, arranged mechanically in order to obtain a linear output voltage at the rotation of the rotor.

The most common type, providing the simplest winding technique, gives a trigonometrical output characteristic, according to the rotation, and is proportional to produce a sine and/or cosine signal.

In some precision-made embodiments, however, the device is provided with a so-called control winding in order to obtain a proportional factor of high accuracy. This is achieved by using a feed-back loop in order to obtain a constant ratio of secondary to primary turns. However, the first-mentioned linear types having a simple winding technique cannot be provided with such control windings.

SUMMARY OF THE INVENTION

The invention comprises a transducer converting a voltage, proportional to the angular rotation and having a variable proportional factor of high reliability. This is achieved by utilizing a primary winding and at least two secondary windings. The secondary windings include the first and second winding arranged perpendicular to each other and rotatable in relationship to the primary winding. The secondary winding may or may not be electrically connected to the same ground. The primary winding is connected to the output of an amplifier which amplifier is inductively fed back by means of the primary winding and one of the secondary windings. The input of the amplifier is connected to an input voltage. The relationship between the voltage across the other secondary winding and the input voltage is a linear measure of the rotation of the secondary windings in relationship to the primary winding. A second feed-back may be provided in parallel with the primary winding for more linear measurement. Where a second primary winding is utilized, the second primary winding has a resistance twice the value of the resistance comprising the first secondary winding feed-back. Where there has been no second primary winding utilized, and merely a resistance feed-back circuit is provided, the resistance value for the feed-back circuit comprising the first secondary winding may be twice the value of the resistance in the resistive feed-back circuit.

Although this invention will be described with respect to its preferred embodiments, it should be understood that many variations and modifications will be obvious to those skilled in the art, and it is preferred, therefore, that the scope of the invention be limited, not by the specific disclosure herein, but only by the appended claims.

DETAILED DESCRIPTION OF THE DRAWINGS

Figure 1:
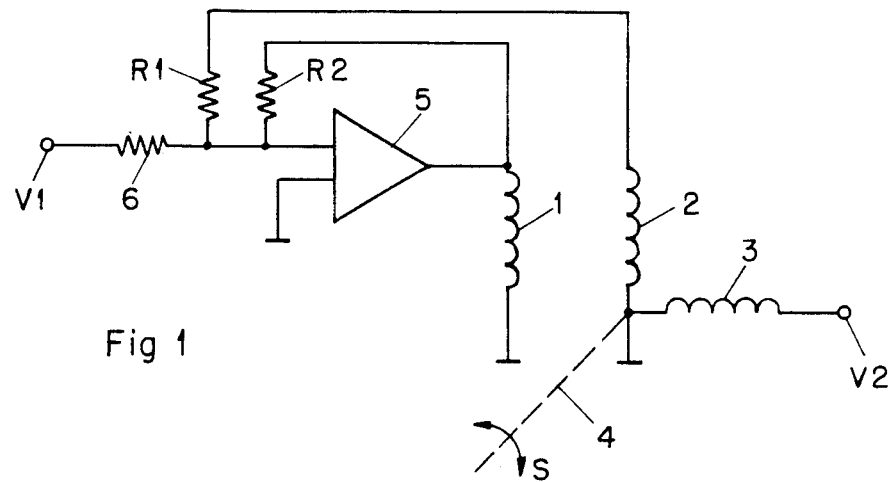
Figure 2:
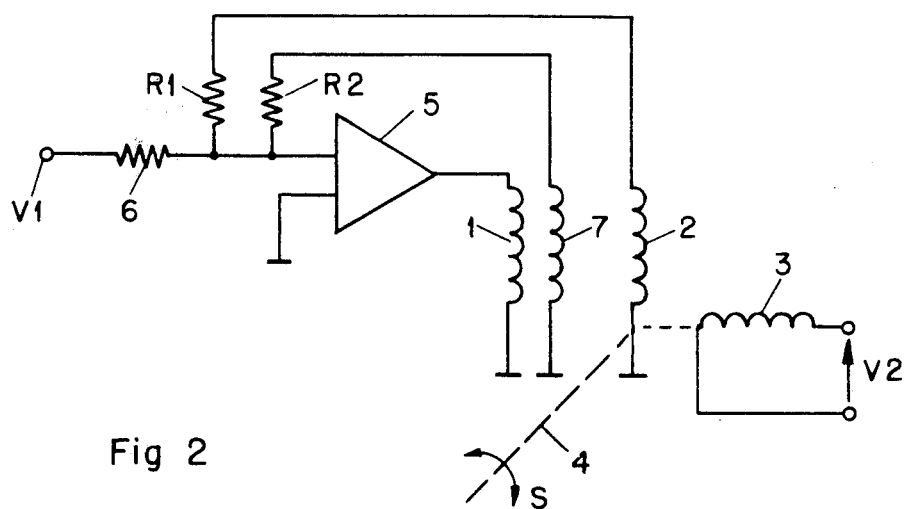

The invention will be further described by means of the enclosed drawing, in which FIG. 1 shows an embodiment of the device in accordance with the invention, FIG. 2 shows a variation of the embodiment according to FIG. 1.

In the FIG. 1 embodiment, a primary winding is designated 1 and a first and a second secondary winding are designated 2 and 3, respectively. In this embodiment, the primary winding is fixed and the secondary windings are rotatable. The reverse relation may, of course, also be possible. The secondary windings rotate about an axis 4. The secondary windings 2 and 3 are perpendicularly arranged to each other and are rotatable about axis 4 in relation to the primary winding 1.

The primary winding 1 is connected between the output of an amplifier 5 and a fixed potential, e.g., zero potential. One end of the secondary windings is also connected to the zero potential and the second end of the first secondary winding is connected to the input of amplifier 5. The resistance of the first secondary winding and the whole circuit in which said winding is coupled is designated R1 in the figure. Amplifier 5 has a feed-back loop comprising resistance R2.

The input of amplifier 5 is fed from a voltage source V1 via a resistance 6.

As mentioned above, the one end of the secondary winding 3 is connected to zero potential while the second end forms the terminal V2. The voltage of said winding is measured over said terminal. The angle $s$ for the rotation of the secondary windings is determined from the relations between the voltages V2 and V1. This will be expressed mathematically below.

FIG. 2 differs from FIG. 1 insofar that winding 3 in this embodiment is coupled, not galvanically, but only mechanically with the first secondary winding 2 and amplifier 5 has an inductive feed-back loop comprising another fixed secondary winding 7, said winding 7 being arranged in parallel with the primary winding 1. The resistance of the feed-back circuit is designated R2. The purpose of having said fixed secondary winding will be evident from the below disclosure.

Said two figures only show two different embodiments of an arrangement of the invention but further embodiments within the scope of the invention are possible. Amplifier 5 may, for instance, be coupled as a voltage-follower and voltage V1 is thereby fed to the one input and resistances R1 and R2 are connected to the second input or otherwise windings 1 and 2 or 7 and 2 are coupled in series in a suitable manner.

The ratio of the respective secondary to the primary turns in the figures is such that the output voltage from the first secondary winding 2 is proportional to a cosine signal for the rotation and the output voltage from the second secondary winding is proportional to a sine signal for the rotation. The angular position $s = 0$ is, for instance, defined as the position in which the output voltage from the second secondary winding 3 is zero.

We assume that conductance G1 = 1/R1 and conductance G2 = 1/R2. We obtain the following relationship between a voltage V3 across the primary winding 1 and the input voltage V1 of the amplifying system and the rotational angle s:

$$V3 = V1 \cdot [1/G2 + G1 \cos s)],$$

where G1 and G2 are the respective total conductances of their respective current branch.

We further obtain:

$$V2 = V3 \sin s = [\sin s/(G2 + G1 \cos s)] \cdot V1$$

By choosing different values for resistances R1 and R2, different characteristics may be chosen for the ratio V2/V1.

For ease of calculation, said characteristics are normalized to make the inclination at 0 = 1, i.e. G1 + G2 = 1.

It might be advantageous to use the important particular case when G2 is equal to or almost equal to 2·G1. As a fact the ratio will here be V2/V1 = s · constant.

Now, if G1 + G2 is equal to 1, the constant in the above equation will be ≈ 1 and we obtain the wanted ratio.

This is achieved in the following way:
Develop sin s and cos s, respectively:

$$\sin s = s - \frac{1}{6} s^3 + \frac{1}{120} s^5 - \ldots$$

$$\cos s = 1 - \frac{1}{2} s^2 + \frac{1}{24} s^4 - \ldots$$

We obtain:

$$\frac{V2}{V1} = \frac{s\left(1 - \frac{1}{6} s^2 + \frac{1}{120} s^4 - \ldots\right)}{1 - \frac{s^2}{6} + \frac{s^4}{72} - \ldots} =$$

$$\frac{s\left(1 + \frac{s^4}{120\left(1 - \frac{s^2}{6}\right)} - \ldots\right)}{1 + \frac{s^4}{72\left(1 + \frac{s^2}{6}\right)} - \ldots} \cdot \frac{1}{1 - \frac{s^2}{6}} - \ldots \approx s\left[1 + s^4\left(\frac{1}{120} - \frac{1}{72}\right)\right];$$

where $\frac{1}{120} - \frac{1}{72} = -0.0055$

This may be written V2/V1 = s [1 + K (s)], where K (s) is less than − 0.0055 ·s⁴. In practice the deviation from the linear function is only 0.0018 when s = 45°.

The type of transducer described in FIG. 1 is in certain cases impaired by the fact that the ratio of the primary to the secondary turns varies with the temperature and this may only be compensated for to a certain extent. When this weakness cannot be accepted, one has to choose a precision transducer having a further fixed secondary winding according to FIG. 2.

Winding 7 as well as winding 2 in FIG. 2 do not carry much current and the changes in resistance owing to temperature will consequently not be noticeable. Furthermore, there is no change in the ratio of the first secondary to the second secondary turns.

In a dimensioning example, the resistances in FIG. 1 may represent the below values:

R1 = 200 kΩ, R2 = 100 kΩ and resistance 6 = 66.67 kΩ. The amplifier may be of the National Semiconductor type LM 201.

Using the above expressions, this gives:

$$V2/V1 = s.$$

Although this invention has been described with respect to its preferred embodiments, it should be understood that many variations and modifications will now be obvious to those skilled in the art, and it is preferred, therefore, that the scope of the invention be limited, not by the specific disclosure herein but only by the appended claims.

What is claimed is:

1. An electromechanical transducer for converting mechanical analog angular information to electrical linear information, comprising
   a primary winding and at least one first and one second secondary winding, said first and said second secondary windings being spatially arranged perpendicularly to each other and rotatable together in relation to the primary winding;
   an amplifier, said primary winding being connected to the output of said amplifier;
   said amplifier being fed back by two feedback circuits, a first of said circuits including a first impedance over which is fed a voltage proportional to the output voltage of said amplifier and the second of said circuits being a series connection of said first secondary winding and a second impedance;
   means applying an input voltage to said amplifier;
   the values of said first and second impedances and the turns ratios of said windings being chosen so that the relation between the voltage across said second secondary winding and the input voltage to said amplifier is a linear measure of the rotation of the secondary windings in relation to the primary winding.

2. An electromechanical transducer in accordance with claim 1 further including a second primary winding inductively coupled to and in spatially parallel relation to said first-mentioned primary winding and wherein said first feedback circuit includes said second primary winding.

3. An electromechanical transducer in accordance with claim 2, wherein the resistance value of the second feed-back circuit comprising the first secondary winding is twice the resistance value of the first feedback circuit comprising the second primary winding.

4. An electromechanical transducer in accordance with claim 1, wherein the resistance value of the second feed-back circuit comprising the first secondary winding is twice the resistance value of the first feed-back circuit.

5. An electromechanical transducer in accordance with claim 1, wherein said first and second secondary windings have one common terminal connected to ground potential.

* * * * *